United States Patent [19]

Lowry

[11] Patent Number: 4,644,970

[45] Date of Patent: Feb. 24, 1987

[54] MIXING FAUCET

[76] Inventor: Robert D. Lowry, 330 Marguerite Ave., Cuyahoga Falls, Ohio 44221

[21] Appl. No.: 786,533

[22] Filed: Oct. 11, 1985

[51] Int. Cl.[4] .......................... F16K 11/06; F16L 5/00
[52] U.S. Cl. .............................. 137/625.41; 137/360; 137/358; 251/292
[58] Field of Search .................. 137/625.41, 360, 358, 137/357, 301, 625.46, 359, 625.4; 251/292, 291, 118

[56] References Cited

U.S. PATENT DOCUMENTS 1,754,310  4/1930  Ellenberger ................... 251/291
2,810,395  11/1957  Simmons ....................... 137/360

FOREIGN PATENT DOCUMENTS 2915667  4/1970  Australia ..................... 137/625.41
547573  9/1956  Italy ............................ 137/625.41

Primary Examiner—Alan Cohan
Assistant Examiner—John S. Starsiak, Jr.
Attorney, Agent, or Firm—Frederick K. Lacher

[57] ABSTRACT

A mixing faucet assembly especially adaptable for frost-free installation has a casing with a mixing chamber containing valve means for controlling the flow of hot and cold water into the chamber. The mixed water is conveyed from the mixing chamber to a tubular member having a nozzle spaced from the casing. A control rod is connected to the valve means and extends through the tubular member to a single handle control adjacent to the nozzle so that upon rotation of the control rod hot and cold water is selectively metered into the mixing chamber and from there communicated to the nozzle. The control rod may be detachedly connected to the valve means at the casing and the casing may be detachably connected to the tubular member for servicing the faucet assembly from the inside of a building.

2 Claims, 5 Drawing Figures

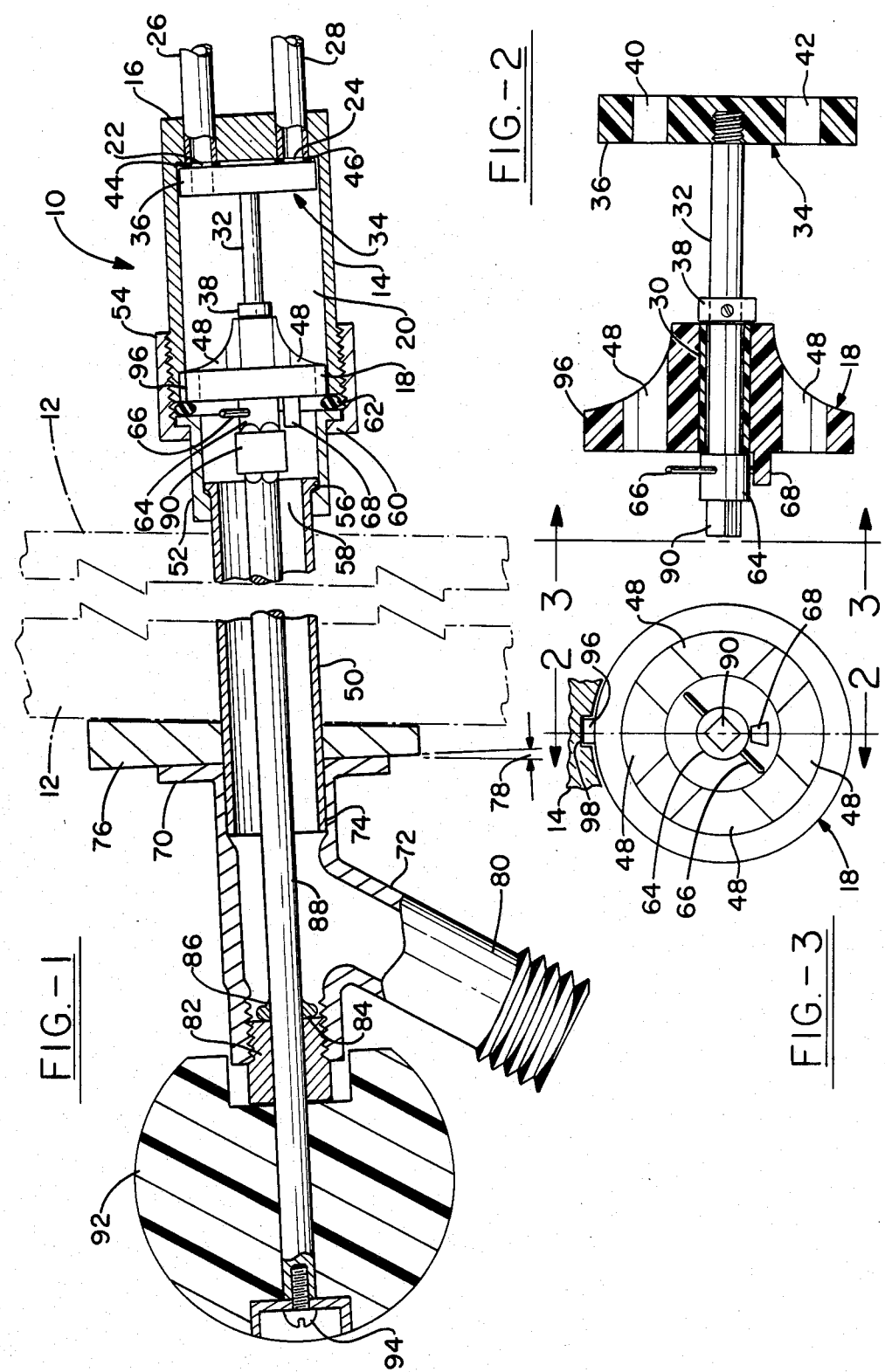

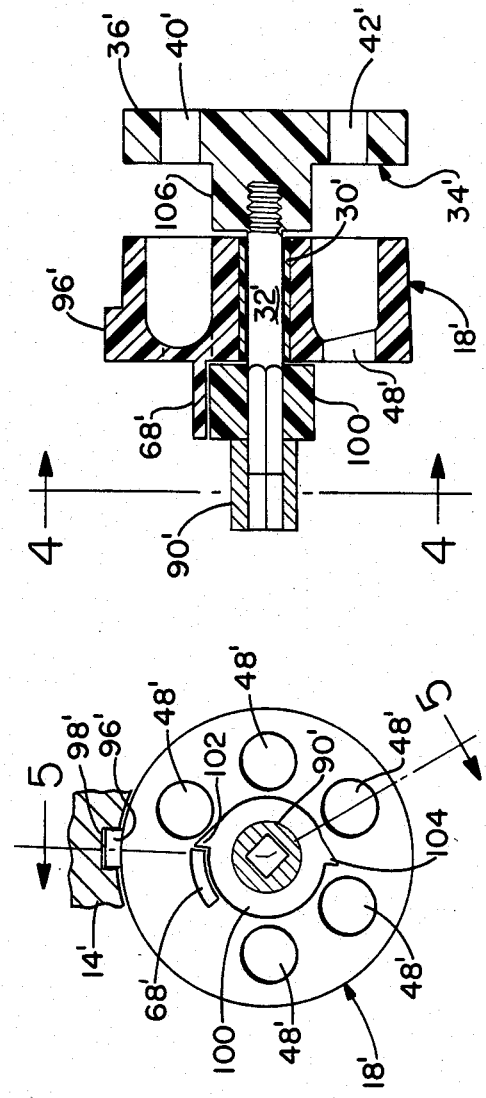

MIXING FAUCET

This invention relates generally as indicated to a mixing faucet assembly and especially to faucets for frostfree installations where the water supply lines can be shut off at a position at the inside wall of a building. Heretofore one frostfree mixing faucet has been proposed in which two single frostfree faucets have been combined by joining the nozzles and using the two handles to adjust the amount of hot and cold water which is mixed at the joined nozzle. In another system one handle was provided to turn the water on and off and another handle was provided to control the mixing of the hot and cold water. The present invention is directed to a mixing faucet where the mixing and turning the water on and off is done with only one handle controlling a valve means in a single mixing chamber. Also the water passes straight through the mixing chamber in the casing and not out through the sides or in a bypass type system.

In accordance with one aspect of the invention there is provided a mixing faucet comprising a casing having a mixing chamber, an inlet plate member at one end of the mixing chamber, the inlet plate member having a hot water inlet port and a cold water inlet port, an outlet member at an opposite end of the mixing chamber having a mixed water outlet port, valve means mounted for rotation in the mixing chamber to selectively open and close the cold water inlet port and the hot water inlet port, an elongated tubular member having an open first end fastened to the outlet member and in communication with the mixed water outlet port, the tubular member having a closed second end including a nozzle in communication with the tubular member, a control rod connected to the valve means extending through the tubular member and through the closed second end, a single handle means mounted on the control rod for rotating the valve means, the cold water inlet port and the hot water inlet port being selectively open upon rotation of the valve means in one direction to provide a mixture of hot and cold water in the mixing chamber for passage through the mixed water outlet and the tubular member to the nozzle and the cold water inlet port and the hot water inlet port being closed at the inlet plate member upon rotation of the valve means in an opposite direction.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but two of the various ways in which the invention may be employed.

In the annexed drawings:

FIG. 1 is a sectional view of a mixing faucet embodying the invention mounted on an outside wall shown in dot-dash lines with parts being broken away.

FIG. 2 is an enlarged sectional view of the outlet member and the valve means shown in FIG. 1 taken along the line 2—2 in FIG. 3.

FIG. 3 is an end view of the outlet member and valve means shown in FIGS. 1 and 2 taken along the line 3—3 in FIG. 2 and showing a fragmentary portion of the casing.

FIG. 4 is an end view like FIG. 3 of a modified outlet member and valve means taken along the line 4—4 in FIG. 5.

FIG. 5 is a sectional view of the modified outlet member and valve means taken along the line 5—5 in FIG. 4.

Referring to the drawings and especially FIGS. 1, 2, and 3 a mixing faucet 10 embodying the invention is shown mounted on the outside wall 12 of a building. Within the building the faucet 10 has a cylindrical casing 14 which may be of brass or other suitable material. An inlet plate member 16 closes one end of the casing 14 and an outlet member 18 closes the other end to define a mixing chamber 20 within the casing. The inlet plate member 16 has a cold water inlet port 22 and a hot water inlet port 24 connected to supply pipes 26 and 28 in communication with sources of hot water and cold water.

The outlet member 18 shown in greater detail in FIGS. 2 and 3 has a sleeve 30 for supporting a shaft 32 of a valve means 34 including a mixing plate 36 mounted on the shaft as by threaded engagement of the shaft with the mixing plate. The shaft 32 holds the mixing plate 36 in close engagement with the inlet plate member 16 through clamping action of a collar 38 on the shaft preventing axial movement of the shaft away from the inlet plate member 16.

The mixing plate 36 has openings 40 and 42 which may be circular or of other suitable shapes for registering with the cold water inlet port 22 and hot water inlet port 24 to meter the hot and cold water from the supply pipes 26 and 28 into the mixing chamber 20. Spring loaded sealing washers 44 and 46 may be positioned in the cold water inlet port 22 and hot water inlet port 24 for engagement with the mixing plate 36 so that when the mixing plate is turned to a position with the openings 40 and 42 spaced from the inlet ports 22 and 24 the flow of water into the mixing chamber will be stopped.

The outlet member 18 has mixed water outlet ports 48 providing communication of the mixed water from the mixing chamber 20 to an elongated tubular member such as copper tube 50 which is connected to the casing 14 by suitable means such as flared coupling 52 and a retainer nut 54. The flared coupling 52 fits over a flange 56 on open first end 58 of the tube 50 and under a flange 60 of the retainer nut 54 which is threaded over the casing 14 at the outlet end. An O-ring seal 62 may be positioned between the flared coupling 52 and the edge of the casing 14 to provide a fluid tight seal.

The shaft 32 has a cylindrical boss 64 with a stopping pin 66 rotatable into engagement with a stopping block 68 mounted on the outlet member 18 for limiting the turning movement of the mixing plate 36 from a closed position to a hot water position. In between these positions there is a mixing of the hot and cold water communicated to the mixing chamber 20 through the cold water inlet port 22 and hot water inlet port 24 and metered through the openings 40 and 42 in the mixing plate 36.

The tube 50 is mounted in the wall 12 by suitable means such as a mounting flange 70 on a nozzle member 72 of brass or other suitable material which may be sweated on a second end 74 of the tube 50. A shim 76 may be positioned between the mounting flange and wall 12 to compensate for the slope of the tube 50 from the inside of the building to the outside of the building at an angle 78 to provide drainage of water from the faucet to a nozzle 80 and prevent freezing of the water in the faucet 10.

The tube 50 is closed at the second end 74 by a bushing such as packing nut 82 threaded in a threaded opening in the nozzle member 72. The packing nut 82 may have an interface 84 for engagement with a flanged portion such as pinched stop 86 on a control rod such as round brass rod 88 extending through the packing nut and up to the shaft 32 of the valve means 34. The rod 88 has a square end (not shown) which fits in a square coupler 90 fastened to the shaft 32. A single handle means such as faucet handle 92 is mounted on the other end of the rod 88 which also may be squared to fit in a square opening in the handle which is held on the rod by suitable means such as screw 94.

It is desirable that the outlet member 18 does not rotate in the casing 14 and therefore suitable means such as a key 96 may be provided on the outlet member for engagement with a keyway 98 in the radially inner surface of the casing 14.

In operation with the handle 92 turned in one direction the mixing plate 36 is positioned over the cold water inlet port 22 and hot water inlet port 24 preventing flow of water from the supply pipes 26 and 28 into the mixing chamber 20. In this position any water in the tube 50 will drain out through the nozzle 80 and prevent freezing. When the handle 92 is turned, the openings 40 and 42 will be selectively aligned with the cold water inlet port 22 and hot water inlet port 24 to meter the hot water and cold water into the mixing chamber 20. This is usually done in such a manner that the cold water is metered into the mixing chamber first and then the hot water at a later time with the cold water being turned off and the hot water being turned fully on at the final on position of the faucet. This position and the closed position are determined by engagement of the stopping pin 66 with the stopping block 68.

When the faucet 10 is to be serviced the retainer nut 54 is rotated and threaded off of the casing 14. The supply pipes 26 and 28 may also be disconnected. Then the casing 14 may be pulled away from the wall 12 disengaging the square coupler 90 from the square end of the rod 88 and making the valve means 34 available for cleaning and servicing. To assemble the faucet 10 the casing 14 is moved toward the wall 12 and the square coupler 90 moved over the end of the rod 88 after which the retainer nut 54 is rotated for threading on the casing 14 compressing the O-ring seal 62. The supply pipes 26 and 28 may then be connected and the water turned on for operation.

Referring to FIGS. 4 and 5 a modification is shown and in the description of this modification where parts are similar or the same the same numerals will be used with the addition of a prime mark. In this modification the outlet member 18' has mixed water outlet ports 48' and a key 96' for engagement with the keyway 98'. In the casing 14' valve means 34' includes a mixing plate 36' with openings 40' and 42'. A valve shaft 32' is fastened to the mixing plate 36' by a threaded connection and rotatably mounted in a sleeve 30' of the outlet member 18'. A boss 100 of brass or other suitable material is fastened to the shaft 32' and has stops 102 and 104 for engaging a stopping block 68' extending from the outlet member 18'. A square coupler 90' is mounted on the end of the shaft 32' for receiving the square end of the rod 88'. The mixing plate 36' is made with an axially extending cylindrical spacer 106 to hold the mixing plate against the inlet plate member 16' of the casing 14'. In operation this assembly operates in substantially the same manner as the embodiment shown in FIGS. 1, 2, and 3.

While certain representative embodiments and details have been shown for the purpose of illustrating the invention it will be apparent to those skilled in the art that various changes and modifications may be made therein without departing from the spirit and scope of the invention.

What is claimed is:

1. A mixing faucet comprising a casing having a mixing chamber, an inlet plate member at one end of said mixing chamber, said inlet plate member having a hot water inlet port and a cold water inlet port, an outlet member at an opposite end of said mixing chamber having a mixed water outlet port, valve means mounted for rotation in said mixing chamber to selectively open and close said cold water inlet port and said hot water inlet port, an elongated tubular member having an open first end fastened to said casing at said outlet member and in communication with said mixed water outlet port, said tubular member having a second end attached to a nozzle member, said nozzle having a nozzle in communication with said tubular member, a control rod connected to said valve means extending through said tubular member, through said second end, and said nozzle member, a single handle means mounted on said control rod for rotating said valve means, said cold water inlet port and said hot water inlet port being selectively opened upon rotation of said valve means in one direction to provide a mixture of hot and cold water in the mixing chamber for passage through said mixed water outlet and said tubular member to said nozzle member, said cold water inlet port and said hot water inlet port being closed at said inlet plate member upon rotation of said valve means in an opposite direction, a detachable coupling connecting said control rod to said valve means at said outlet member, said casing at said outlet member being detachably connected to said tubular member for removal of said casing from said tubular member and said control rod to service said valve means, a bushing in said nozzle member, and said control rod extending through said bushing and having a flanged portion located at an interface of said bushing for limiting axial movement of said control rod to hold said control rod in said coupling after installation.

2. A mixing faucet comprising a casing having a mixing chamber, an inlet plate member at one end of said mixing chamber, said inlet plate member having a hot water inlet port and a cold water inlet port, an outlet member at an opposite end of said mixing chamber having a mixed water outlet port, valve means mounted for rotation in said mixing chamber to selectively open and close said cold water inlet port and said hot water inlet port, an elongated tubular member having an open first end fastened to said casing at said outlet member and in communication with said mixed water outlet port, said tubular member having a second end attached to a nozzle member, said nozzle member having a nozzle in communication with said tubular member, a control rod connected to said valve means extending through said tubular member, through said second end, and said nozzle member, a single handle means mounted on said control rod for rotating said valve means, said cold water inlet port and said hot water inlet port being selectively opened upon rotation of said valve means in one direction to provide a mixture of hot and cold water in the mixing chamber for passage through said mixed water outlet and said tubular member to said nozzle member, said cold water inlet port and said hot water inlet port being closed at said inlet plate member upon rotation of said valve means in an opposite direction, a detachable coupling connecting said control rod to said valve means at said outlet member, said casing at said outlet member being detachably connected to said tubular member for removal of said casing from said tubular member and said control rod to service said valve means, a bushing in said nozzle member, and said control rod extending through said bushing and having a stop member located at an interface of said bushing for limiting axial movement of said control rod to hold said control rod in said coupling after installation.

* * * * *